United States Patent
Costanzo et al.

(10) Patent No.: US 8,862,628 B2
(45) Date of Patent: Oct. 14, 2014

(54) METHOD AND SYSTEM FOR STORING DATA IN A DATABASE

(75) Inventors: Luca Costanzo, Genoa (IT); Marco Solimano, Genoa (IT)

(73) Assignee: Siemens Aktiengesellschaft, Munich (DE)

(*) Notice: Subject to any disclaimer, the term of this patent is extended or adjusted under 35 U.S.C. 154(b) by 270 days.

(21) Appl. No.: 12/758,950

(22) Filed: Apr. 13, 2010

(65) Prior Publication Data

US 2010/0262627 A1    Oct. 14, 2010

(30) Foreign Application Priority Data

Apr. 14, 2009    (EP) .................................... 09157843

(51) Int. Cl.
G06F 17/30    (2006.01)

(52) U.S. Cl.
CPC .............. *G06F 17/30595* (2013.01); *G06F 17/30607* (2013.01)
USPC .......................................... 707/799; 707/704

(58) Field of Classification Search
CPC .............. G06F 17/30595; G06F 17/30607
USPC ........................................ 707/602, 704, 799
See application file for complete search history.

(56) References Cited

U.S. PATENT DOCUMENTS

| | | | |
|---|---|---|---|
| 6,016,490 A | 1/2000 | Watanabe et al. | |
| 6,341,302 B1* | 1/2002 | Celis | 718/100 |
| 6,351,749 B1 | 2/2002 | Brown et al. | |
| 7,209,925 B2* | 4/2007 | Srinivasan et al. | 707/602 |
| 7,487,168 B2* | 2/2009 | Rys et al. | 707/999.101 |
| 7,587,428 B2 | 9/2009 | Barabas et al. | |
| 2003/0023617 A1 | 1/2003 | Hunt et al. | |
| 2004/0103105 A1* | 5/2004 | Lindblad et al. | 707/100 |
| 2005/0097128 A1* | 5/2005 | Ryan et al. | 707/103 Y |
| 2006/0168472 A1* | 7/2006 | Chen | 714/6 |
| 2008/0154939 A1 | 6/2008 | Mutschler et al. | |
| 2009/0019456 A1* | 1/2009 | Saxena et al. | 719/318 |
| 2009/0144748 A1* | 6/2009 | Foody | 718/107 |

FOREIGN PATENT DOCUMENTS

| | | |
|---|---|---|
| EP | 1091293 A1 | 4/2001 |
| EP | 1197876 A2 | 4/2002 |

OTHER PUBLICATIONS

European Search Report dated Aug. 28, 2009.

* cited by examiner

*Primary Examiner* — Rehana Perveen
*Assistant Examiner* — Scott A Waldron
(74) *Attorney, Agent, or Firm* — Laurence A. Greenberg; Werner H. Stemer; Ralph E. Locher

(57) ABSTRACT

A method allows one to store in a parallel way branches and nodes of a hierarchy into a database by creating queues. Each queue has a status and a unlock item indicating if a superior node has already been stored. A process looks up these indicators and performs according to commands received from a first process control of the queues.

2 Claims, 3 Drawing Sheets

METHOD AND SYSTEM FOR STORING DATA IN A DATABASE

CROSS-REFERENCE TO RELATED APPLICATION

This application claims the priority, under 35 U.S.C. §119, of European application EP 09157843, filed Apr. 14, 2009; the prior application is herewith incorporated by reference in its entirety.

BACKGROUND OF THE INVENTION

1. Field of the Invention

The present invention relates to a method and a system for storing a hierarchy in a relational database management system (RDBMS) used within a manufacturing execution system (MES). The hierarchy has a root element and is structured into branches with nodes. The method is carried out by a first process knowing the hierarchy and a second process storing branches in the database, and the second process receives commands from the first process.

In the world of process automation and process monitoring standard automation systems for controlling the widest conceivable variety of machines and plants are known in the prior art. Such technology covers in particular a broad range of products which are offered by the Siemens Corporation under its SIMATIC® product family within the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

Software programs can deal with and represent data in various ways. Nowadays the most popular of them are Object Oriented programming and relational databases. Many programs representing data as objects maintain objects "live" in memory, or in their process allocation space, mainly for performance reasons: in this way, in fact, objects are immediately available to processes, without the need of accessing a data storage component, as a relational database management system (RDBMS). On the contrary, RDBMS give a powerful way to make data persistent, and allow other software components to access them in a standard way. The set of objects living in the process allocation space (i.e.: directly available on physical memory) is usually referred as the process image.

In manufacturing execution systems (MES) software applications relational databases are broadly used not only to store data stemming from the production process, but also, and even more attributed, to store configuration data, application data and system data.

The process image of complex programs can be very complex as well, and objects there contained can be related to each other, forming a hierarchy, which can be of different types. In an MES environment a common hierarchy is the topological one, where a plant can be described by a set of objects which can, in turn, contain other objects of a lower level.

In many cases in MES applications we have to handle the persistence in a RDBMS of entities/objects hierarchies that are living in a process image managed using an Object Oriented Approach. One of these topological hierarchies is the plant model with all equipment defined for a plant according to the s95 standard levels, see ANSI/ISA-95.00.01-2000 Enterprise-Control System Integration Part 1: Models and Terminology. Each equipment instance is an entity with a standard attribute, a list of other equipment, methods and default values. Such equipment is inserted in a topological hierarchy, and thus it may contain other equipment, which in turn contains other and so on.

Storing an actual plant can require a lot of time because any equipment has to be sent to the database with a correct sequence, in order to create an effective and a correct hierarchy into the database tables. There, in fact, each item of equipment must be saved only when a superior one (i.e.: the one which contains it) has already been saved. Note that, in order to correctly store a plant it is necessary to store the relation with the parent node for any child equipment. It has to be noted that this problem relies also on the wide field of object-relational mapping (ORM), which is one of the tougher things to accomplish in modern, object-oriented programming languages.

In the state of the art (e.g. prior art), the question is how has this problem been solved up to now?

Usually this operation is made in an asynchronous way sending the object data in a queue. A dedicated process takes data from the queue and stores it in the database. The data have to be inserted, in the queue, in the correct order: first is the root entity then the first children level and so on. On the other side the process that stores data in a RDBMS has to proceed storing the root equipment and then the first children level of equipments storing also, for each child, the relation with the parent node. The correct ordering is guaranteed by the fact that:

The module where the hierarchy is defined is the one which inserts the equipment in queue, and thus can insert them in the correct order.

Elements in the queue are stored one by one; the subsequent element is stored only when the previous has been correctly stored, thus not altering the order.

The drawbacks of this approach are now described.
i) Since storing the equipment in RDBMS is an operation longer than inserting it in a queue, to avoid that it may grow indefinitely, speed of saving is ultimately determined by RDBMS.
ii) Additionally, to preserving ordering, the queue is unique and it is not possible to take advantage of multiprocessor hardware (HW), which is available now.
iii) The operation is not scalable.

Due to the above problems, this operation can be very time-consuming and ultimately unaffordable in case of a hierarchy with large structures to save. In such a case, downloading a plant model of medium complexity can require hours of work on the RDBMS side.

SUMMARY OF THE INVENTION

It is accordingly an object of the invention to provide a method and a system for storing a hierarchy in a RDBMS which overcome the drawbacks of the known solutions for storing a hierarchy in a RDBMS of the prior art methods and devices of this general type.

With the foregoing and other objects in view there is provided, in accordance with the invention a method for storing a hierarchy in a database being part of a relational database management system. The hierarchy has a root element and is structured into branches with nodes. The method is carried out by a first process knowing the hierarchy and a second process storing the branches in the database. The second process receives commands from the first process. The method includes structuring the second process in queues, where a queue is created via a command from the first process except a first queue which is always present with a status RUNNING. The other queues are created with a status WAIT.

Each of the queues has access to the database independently from another one of the queues. The root element is inserted in the first queue and the root element is stored in the database. Further nodes of the hierarchy are inserted in the other queues, where in each of the queues an unlock item is held indicating if a superior node already has been stored in the database, if not, the queue is held in the status WAIT until the unlock item contains an id of the superior node. A threading of the queues is performed via the second process by extracting a first node, storing the first node in the database, and looking in the other queues if one of them has the unlocked item equal to the superior node just stored, and changing the status of the queue to RUNNING.

To speed up the overall operation objects must be stored in parallel, while maintaining a correct ordering. The basic idea comes noting that the order must be maintained inside a branch of the global tree, but parallel branches can be stored independently. Exploiting this idea makes it possible for the storing process to able to work in parallel: each branch of the tree will in fact be processed by a different thread running in parallel. The number of threads can be configured taking in account PC resource usage versus speed of saving and spread of hierarchy. Since the number of threads does not affect the saving process behavior, but only its speed, the process is easily scalable according to user needs.

The advantages of the present invention are related to the possibility to save in a parallel way a branch of a hierarchy leaving to the owner of the tree the configuration and the optimization of the algorithm to avoid queue to stop/start many time.

With this approach saving complex hierarchy of objects in databases is feasible in reasonable time. Moreover, the time can be further reduced by adjusting the number of queues, leveraging multiprocessor architectures more and more common nowadays. With this approach, we can make complex hierarchies of objects saved on RDBMS in a time which is compatible with real time operations. In this way, the publication of such structures living in process images of single programs can be done on standard ROBMS, opening a wide set of possibilities.

The proposed algorithm can be in advance widely used in every case where a object oriented structure must be saved on RDBMS, like in the more recent object-oriented programming methodologies (see Microsoft's OEM for an example).

Other features which are considered as characteristic for the invention are set forth in the appended claims.

Although the invention is illustrated and described herein as embodied in a method and a system for storing a hierarchy in a RDBMS, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF TH DRAWING

DETAILED DESCRIPTION OF THE INVENTION

Figure 1:
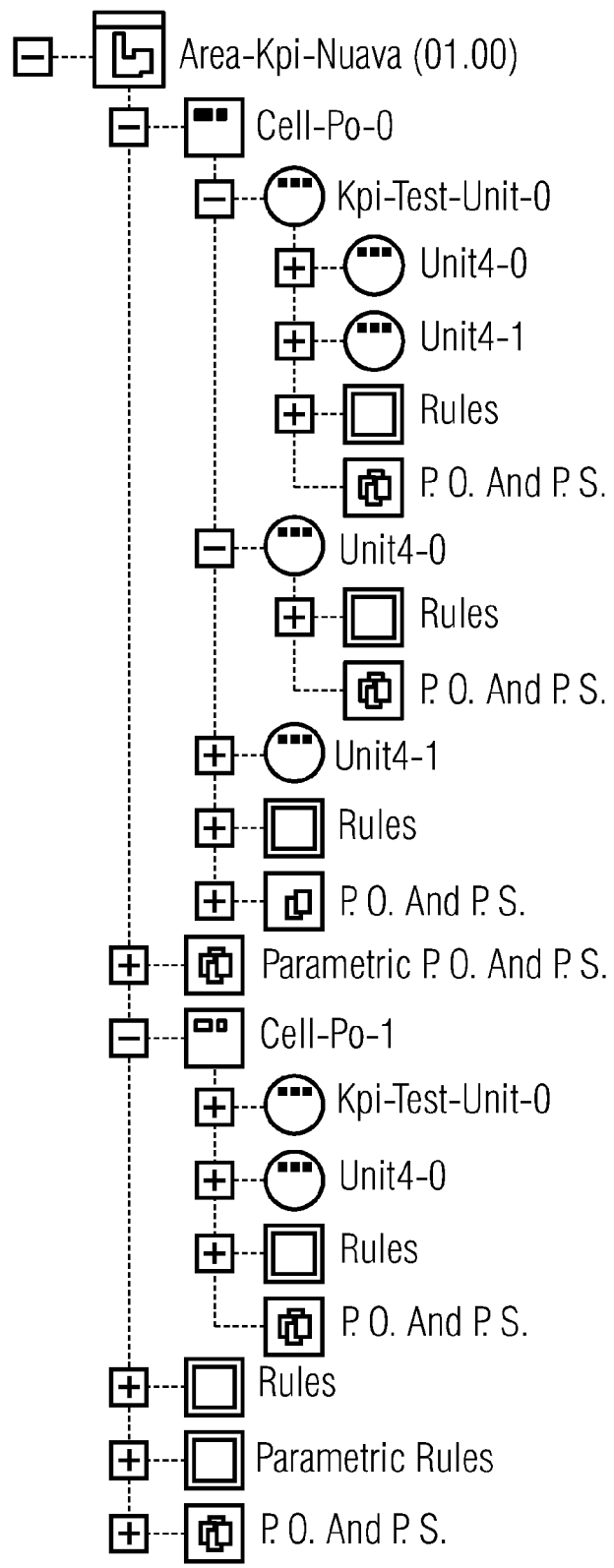
FIG. 1 is an illustration of a plant hierarchy according to the invention.

Referring now to the figures of the drawing in detail and first, particularly, to FIG. 1 thereof, there is shown as an example of a hierarchy, a plant hierarchy. The hierarchy is structured into several branches. It can be easily noticed that each branch can be saved independently from others. One may assume to have more than one queue saving objects. This is not yet sufficient however; because it is not wanted that each queue will be statically assigned to a branch of the tree. In other words, it is not wanted that in the previous example CELL-PO-O branch will be managed by queue Q1 and CELL-PO-1 branch by queue Q2.

The main reasons are:

i) Saving time in the different branches can vary in unpredictable ways (it depends from a single object's complexity, which should not be considered in advance, to speed up the algorithm).

ii) The number of elements in the branches and the sub branches can be very different, so having a queue working and another empty, and thus not exploiting parallel computing.

iii) It may not be inserted a "predictive" algorithm to decide which queue must be used; instead, the algorithm must work even if the queue is chosen randomly.

So, the algorithm must deal with the fact that in the same queue, objects belonging to different trees must be inserted, while still maintaining the correct order between them.

Figure 2:
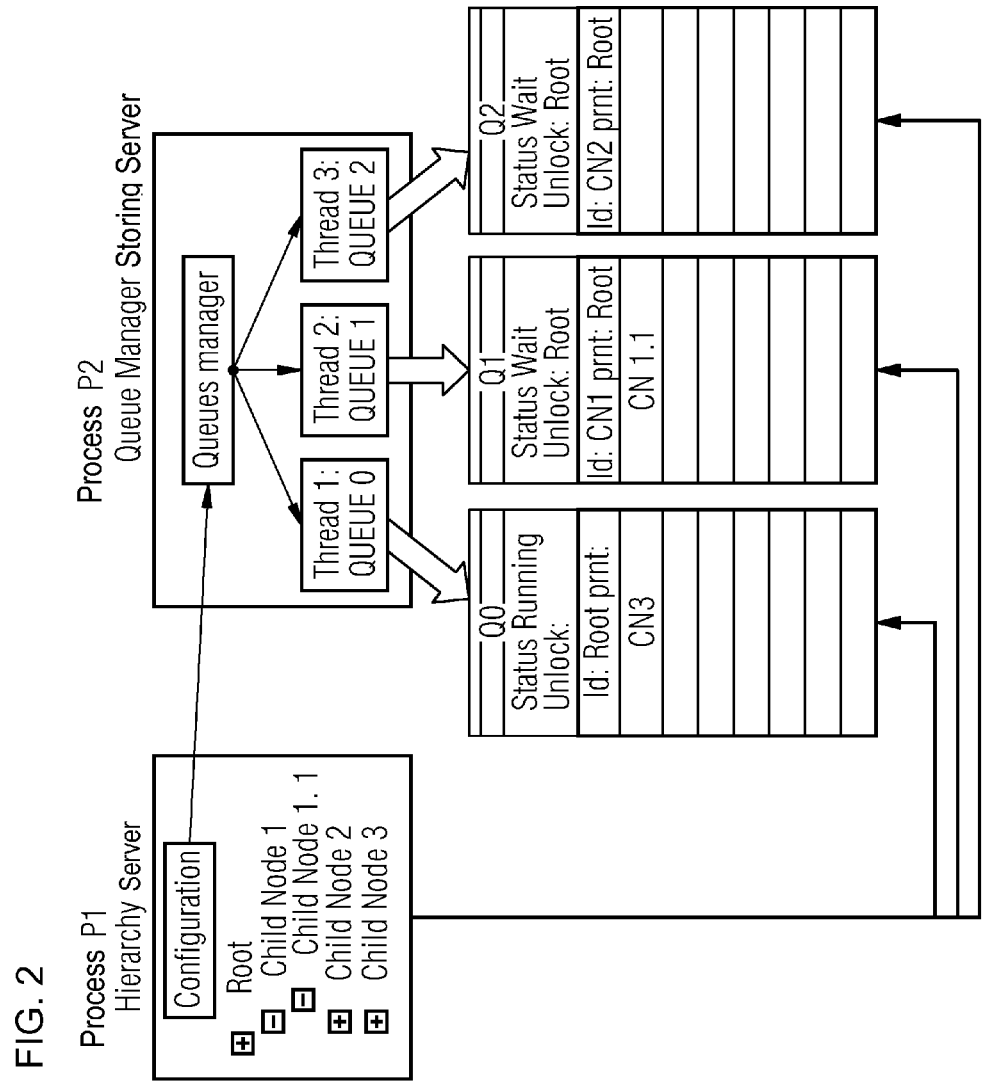
FIG. 2 is an illustration showing elements as queues, branches and nodes deriving from a hierarchy and their relationship.

Before describing the algorithm, the involved elements are listed as follows with reference to FIG. 2:

1. Process P1 manages the object hierarchy and is shown in FIG. 2. This is an object oriented process which holds the process image and deals with living objects; particularly, it knows the hierarchy. The main tasks of process P1 are now described:

1.1 To communicate to the Queue Manager, implemented via a Storing Server, how many queues are needed.

1.2 To walk through the tree starting from the root and the processing children.

1.3 Sending an item to a queue.

Figure 3:
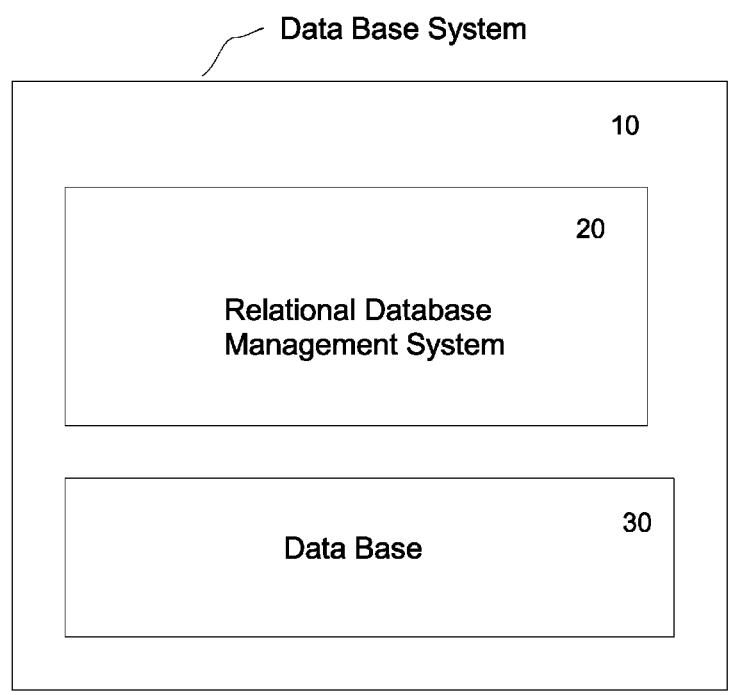
FIG. 3 is an illustration showing the whole database system.

2. The Storing Server creates and manages queues and stores objects in a RDBMS 20 being part of a database system 10 having a database 30 as shown in FIG. 3. A direct link library (DLL) that expose the set of an application programming interface (API)) has to be used by the process P1 in order to communicate with the server. The main tasks of the Storing Server are:

2.1 Creating the required queues and managing their status.

2.2 Serializing access to the header information of queues.

2.3 Extracting items from queues in parallel (a thread is dedicated to that for each queue).

2.4 Storing data items on RDMBS.

3. A queue is an item living in the process P2 respectively in the storing server, created by a command from the process P1, which has the following attributes:

3.1 Status: RUNNING, WAIT, FULL.

3.2 Unlock Item: Is an identification of the item that has to be already saved into RDBMS before proceeding to extract a new item from the queue.

3.3 Item list: Contains items representing the entities to be stored on the database; each item is a node of hierarchy.

3.4 The number of items in the queue (zero means an empty queue). It has to be considered that the queue has a maximum dimension in term of bytes.

The status of a queue determines its behavior: when a queue is in status WAIT, no elements will be saved.

4. The main Queue Q0 is a queue like others queues but
  4.1 it is always created;
  4.2 The status is set to "RUNNING" at the creation by default. All remaining queues are created with the status set to WAIT.
  4.3 The unlock element for all queues except the main queue contains the name of the "Root" of the plant hierarchy.

5. Item: is a file of type XML that contains data to be stored: in this file of type XML the following information are mandatory.
  5.1 Unique id of equipment (or tree node id).
  5.2 Unique id of his parent equipment (parent tree node id) root node has this field empty.

The algorithm is described in the following:
a) Process P1, looking at a hierarchy to save, and a user configuration asks Process P2 to create n queues.
b) Process P2 looks if the requested number of queues has already been created; if not, it will be created.
c) Process P1 inserts the hierarchy root element in the main queue (all other queues are waiting for the root to be saved).
d) Process P1 recursively looks at sub nodes of the tree and inserts them in available queues. The choice of the queue must not be important: it can be a simple round robin algorithm. What is important is that each item is inserted with the knowledge of its "superior" (i.e. the object containing it in hierarchy).
e) Process P2 threads managing queues by the steps:
  V.1 Extract the first item;
a) V.2 Save it on RDBMS;
b) V.3 Once saved, it looks on other waiting queues: if some of them has the "unlock item" equal to the one just saved, it changes its status to RUNNING;
c) V.4 If the saving on RDBMS fails because the superior object has not been saved:
  i) The queue's status is set to WAIT,
  ii) the unlock item is set to the name of the superior object blocking.

It has to be noted that with this approach a dead lock can not be excluded, in this case:
(1) A superior object SO is inserted in a queue Q1 different from that containing a child node CN in Queue Q2;
(2) The superior object SO is saved in the very same moment when the child node CN fails;
(3) The queue Q2 status is checked (due to the save of the superior object SO) from queue Q1 before being set to "fail" (due to failure in saving the child Node CN).

In this case, when the superior object (SO) is saved queue Q2 is not awakened (because is still running) and shortly after queue Q2 is put in wait (by failure in saving the CN), without being awakened later by queue Q1 (because the SO has already been saved).

This is true also in case where we have more than two queues. To avoid this dead lock, a simple retry mechanism can be added at the last point of the previous algorithm: when the saving on RDBMS fails because the superior object has not been saved, another retry is issued. The retry for sure comes after the saving of the superior object, and thus the saving can proceed. To cover each possible time combination, this retry is issued when both of the following conditions occur:
  Failure of saving the element in queue; and
  Status of the holding queue equal to run.

An embodiment of the present invention will be explained with the following example, let's suppose that the below depicted hierarchy has to be saved on a RDBMS:

Site-O
  Area-01
    Cell-011
    Cell-012
  Area-02
    Cell-021
    Cell-022
  Area-03
    Cell-031
    Cell-032
  Area-04
    Cell-041
    Cell-042

A user configured process P2 is to have 3 queues available; inserting an element in a queue from process P1 to the storing server is faster than storing an element from the queue to the RDBMS. At a certain point, a connection between the RDBMS and the storing server might break. Let's now follow a step-by-step discussion of what can happen with the proposed algorithm:

1. At time $t_1$ process P1 inserts in the queue the following data:

| | | |
|---|---|---|
| ID: Q0 | ID: Q1 | ID:Q2 |
| Status: RUNNING | Status: WAIT | Status: WAIT |
| unlock item: | unlock item: Site-O | unlock item: Site-O |
| Item id: Site-O | | |
| Parent Id: NULL | | |

2. At time $t_2$ process P2 starts to insert Site-O in the database and process P1 inserts new elements in queues.

| | | |
|---|---|---|
| ID: QO | ID: Q1 | ID:Q2 |
| Status: RUNNING | Status: WAIT | Status: WAIT |
| unlock item: | unlock item: Site-O | unlock item: Site-O |
| Item id: Site-O | Item id: Area-01 | Item id: Area-02 |
| Parent Id: NULL | Parent Id: Site-0 | Parent Id: Site-0 |
| Item id: Area-03 | | |
| Parent Id: Site-0 | | |

3. At time $t_3$ the process P2 ends inserting Site-O in the database and does the following actions:
  Sets running all queues where unlock Item is equal to the element yet inserted;
  Deletes the unlock item in the queue to start;
  Eliminates item saved on db (Site-O) from queue.
  process P1 adds Area-04 in Q-1 and Item id: cell-011 in Q-2.

| | | |
|---|---|---|
| ID:QO | ID: Q1 | ID:Q2 |
| Status: RUNNING | Status: RUNNING | Status: RUNNING |
| unlock item: | unlock item: | unlock item: |
| Item id: Area-03 | Item id: Area-01 | Item id: Area-02 |
| Parent Id: Site-0 | Parent Id: Site-0 | Parent Id: Site-0 |
| | Item id: Area-04 | Item id: cell-011 |
| | Parent Id: Site-0 | Parent Id: Site-0 |

4. At time $t_4$ we suppose to have the following situation:
  Item id: Area-01 is very big and saving it on RDBMS takes a lot of time.
  Item id: Area-02 is instead a very small area and it is saved in a shorter period.

This leads to the queues filled in the following way:

| ID: QO | ID: Q1 | ID: Q2 |
|---|---|---|
| Status: RUNNING | Status: RUNNING | Status: RUNNING |
| unlock item: | unlock item: | unlock item: |
| Item id: Area-03 | Saving .. .. | Saved |
| Saving .. .. | Item id: Area-01 | Item id: Area-02 |
| Parent Id: Site-0 | Parent Id: Site-0 | Parent Id: Site-0 |
| | Item id: Area-04 | Item id: cell-011 |
| | Parent Id: Site-0 | Parent Id: Site-0 |

5. At time $t_5$ Q2 of Process P2 tries to save item cell-011 but fails because Area-01 is not yet committed in the database.

| ID:QO | ID: Queue-1 | ID:Queue-2 |
|---|---|---|
| Status: RUNNING | Status: RUNNING | Status: RUNNING |
| unlock item: | unlock item: | unlock item: |
| Item id: Area-03 | Saving .. .. | Saving .. .. |
| Saving .. .. | Item id: Area-01 | Item id: Cell-011 |
| Parent Id: Site-0 | Parent Id: Site-0 | Parent Id: Area-01 |
| | Item id: Area-04 | |
| | Parent Id: Site-0 | |

6. Then, at time $t_6$ process P2
(1) set unlock element to Area-01;
(2) change the status from RUNNING to WAIT;
(3) and make a new retry.

| ID: QO | ID: Queue-1 | ID:Queue-2 |
|---|---|---|
| Status: RUNNING | Status: RUNNING | Status: WAIT |
| unlock item: | unlock item: | unlock item: |
| Item id: Area-03 | Saving .. .. | Fail once then retry once |
| Saving | Item id: Area-01 | Item id: Cell-011 |
| Parent Id: Site-0 | Parent Id: Site-0 | Parent Id: Area-01 |
| | Item id: Area-04 | |
| | Parent Id: Site-0 | |

7. If at time $t_7$ process P1 commits Area-01 then
(1) set running all queues where unlock Item is equal to the element yet inserted;
(2) delete the unlock item in the queue to start; and
(3) eliminate item saved on database (Area-01) from queue.

| ID: QO | ID: Queue-1 | ID:Queue-2 |
|---|---|---|
| Status: RUNNING | Status: RUNNING | Status: WAIT |
| unlock item: | unlock item: | unlock item: |
| Item id: Area-03 | Saved .. .. | Retry in progress |
| Saving | Item id: Area-01 | Item id: Cell-011 |
| Parent Id: Site-0 | Parent Id: Site-0 | Parent Id: Area-01 |
| | Item id: Area-04 | |
| | Parent Id: Site-0 | |

Process P2 saves cell-011 in the database: if operation succeeds it is possible to process a new item in queue. If the insert in the database fails because the parent equipment is missing step 6 (see above) is repeated.

The invention claimed is:

1. A method for storing a hierarchy in a database being part of a relational database management system, the hierarchy having a root element and being structured into branches with succeeding elements, the method being carried out by a first process responsible for maintaining an order of the hierarchy and a second process storing data of the branches in the database, the second process receiving commands from the first process, which comprises the steps of:
   i) structuring the second process in steps defining queues, where a queue is created via a command from the first process except a first queue which is previously created with a status RUNNING whereas other ones of the queues are created with a status WAIT;
   ii) each of the queues communicating with the database independently from another one of the queues;
   iii) inserting data defining the root element in the first queue and storing the data defining the root element in the database;
   iv) inserting the succeeding elements of the hierarchy in the other queues, where in each of the queues an unlock item is held indicating if a superior element already has been stored in the database, if not, the queue is held in the status WAIT until the unlock item contains an identifier of the superior element, the unlock item in combination with the status WAIT and the status RUNNING maintaining a proper timing allowing the queues to operate in a parallel manner allowing a parallel loading of the database in a properly maintained hierarchial order;
   v) performing a threading of the queues via the second process by:
      copying a first element;
      storing the first element in the database; and
      changing the status of the queue to RUNNING if the queue has the unlock item indicating that the superior element was just stored; and
   vi) restarting the steps iv) and v) in a case where a dead lock for storing elements occurs because of a failure of storing an element where the failure is caused by the superior element not being saved yet and the status of the queue experiencing the failure is RUNNING.

2. A system for storing a hierarchy in a database being part of a relational database management system, the hierarchy having a root element and being structured into branches with succeeding elements, the system comprising:
   a hierarchy server having a processor programmed to carry out a first process responsible for maintaining an order of the hierarchy and a second process for storing data of branches in the database, the second process receiving commands from said first process;
   an application programming interface;
   a direct link library for exposing said application programming interface allowing the first process to communicate with the second process;
   the processor programmed to:
      i) structure the second process in steps defining queues in a storing server which creates and manages the queues, where a queue is created via a command from the first process except a first queue which is previously created with a status RUNNING whereas other ones of the queues are created with a status WAIT;
      ii) each of the queues communicates with the database independently from another one of the queues;
      III) insert data defining the root element in the first queue and store the data defining the root element in the database;
      iv) insert the succeeding elements of the hierarchy in the other queues, where in each of the queues an unlock item is held indicating if a superior element already has been stored in the database, if not, the queue is held in the status WAIT until the unlock item contains an identifier of the superior element, the unlock item in combination with the status WAIT and the status RUNNING maintaining a proper timing allowing the queues to operate in a parallel manner allowing a parallel loading of the database in a properly maintained hierarchial order;

v) perform a threading of the queues via the second process by:
   copying a first element;
   storing the first element in the database; and
   changing the status of the queue to RUNNING if the queue has the unlock item indicating that the superior element was just stored; and
vi) restarting the steps iv) and v) in a case where a dead lock for storing elements occurs because of a failure of storing an element where the failure is caused by the superior element not being saved yet and the status of the queue experiencing the failure is RUNNING.

* * * * *